US010240060B2

(12) United States Patent
Willems

(10) Patent No.: US 10,240,060 B2
(45) Date of Patent: Mar. 26, 2019

(54) METHOD OF PRINTING

(71) Applicant: OCÉ-TECHNOLOGIES B.V., Venlo (NL)

(72) Inventor: Guido G. Willems, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 26 days.

(21) Appl. No.: 15/435,517

(22) Filed: Feb. 17, 2017

(65) Prior Publication Data

US 2017/0158900 A1    Jun. 8, 2017

Related U.S. Application Data

(63) Continuation of application No. PCT/EP2015/069974, filed on Sep. 1, 2015.

(30) Foreign Application Priority Data

Sep. 3, 2014 (EP) .................................... 14183382

(51) Int. Cl.
*B41J 2/21* (2006.01)
*C09D 11/54* (2014.01)
(Continued)

(52) U.S. Cl.
CPC ............. *C09D 11/54* (2013.01); *B41J 2/2114* (2013.01); *C09D 11/03* (2013.01); *C09D 11/107* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,679,139 A    10/1997   McInerney et al.
5,738,716 A     4/1998   Santilli et al.
(Continued)

FOREIGN PATENT DOCUMENTS

EP    1 125 760 A1    8/2001
JP    10-88022 A      4/1998
(Continued)

OTHER PUBLICATIONS

Japanese 3rd Party Observation for corresponding Japanese Application No. 2017-510611, mailed Aug. 14, 2018, with English translation.

*Primary Examiner* — Manish S Shah
(74) *Attorney, Agent, or Firm* — Birch, Stewart, Kolasch & Birch, LLP

(57) ABSTRACT

A method of printing includes a. providing a substrate, a reaction liquid including a coagulation agent and an ink set including a first ink composition including a first colorant and a second ink composition including a second colorant, different from the first colorant, wherein both the first colorant and the second colorant are dispersed as primary particles in the first ink composition and the second ink composition, respectively; b. applying the reaction liquid to a first surface of the substrate; c. printing a first ink layer of the first ink composition and a second ink layer of the second ink composition on the first surface of the substrate, wherein upon contact with the coagulation agent, the primary particles present in the first ink layer and in the second ink layer agglomerate such that secondary particles are formed in the first ink layer and in the second ink layer respectively, wherein the first ink layer obtains a first opacity and the second ink layer obtains a second opacity, wherein the ink layer obtaining the highest opacity is printed first. With such a method, the color gamut of an ink set including inks having (Continued)

a high light-fastness can be significantly improved. Printed matter, printed with the method is also disclosed.

18 Claims, 3 Drawing Sheets

(51) Int. Cl.
 *C09D 11/03* (2014.01)
 *C09D 11/107* (2014.01)
 *C09D 11/322* (2014.01)
 *C09D 11/38* (2014.01)

(58) Field of Classification Search
 CPC ...... B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/54; C09D 11/52; C09D 11/005; B41M 5/0011; B41M 5/0017; B41M 7/00; B41M 7/0072; B41M 5/52; B41M 5/5218
 See application file for complete search history.

(56) References Cited

U.S. PATENT DOCUMENTS

| | | | |
|---|---|---|---|
| 7,988,277 B2 | 8/2011 | Moribe et al. | |
| 2010/0245508 A1* | 9/2010 | Ikeda | B41M 5/0011 347/95 |
| 2011/0304661 A1* | 12/2011 | Emamjomeh | B41J 2/2114 347/1 |
| 2013/0183501 A1 | 7/2013 | Kasperchik et al. | |

FOREIGN PATENT DOCUMENTS

| | | | | |
|---|---|---|---|---|
| JP | 10-204364 A | 8/1998 | | |
| JP | 2004-106204 A | 4/2004 | | |
| JP | 2004-188878 A | 7/2004 | | |
| JP | 2008-265324 A | 11/2008 | | |
| JP | 2010-194998 A | 9/2010 | | |
| JP | WO 2013065871 A1 * | 5/2013 | ......... | B41M 5/0047 |
| WO | WO 2007/033031 A2 | 3/2007 | | |
| WO | WO 2013/065871 A1 | 5/2013 | | |
| WO | WO 2014/011110 A1 | 1/2014 | | |

\* cited by examiner

METHOD OF PRINTING

CROSS REFERENCE TO RELATED APPLICATIONS

This application is a Continuation of PCT International Application No. PCT/EP2015/069974, filed on Sep. 1, 2015, which claims priority under 35 U.S.C. 119(a) to patent application Ser. No. 14/183,382.2, filed in Europe on Sep. 3, 2014, all of which are hereby expressly incorporated by reference into the present application.

FIELD OF THE INVENTION

The present invention relates to recorded matter having an improved and optimal color gamut and a method of printing for creating printed matter having a high light-fastness, a high print quality and an optimized color gamut, wherein ink compositions comprising dispersed colorants are used in combination with a reaction liquid comprising a coagulation agent.

BACKGROUND ART

In known methods of printing, a reaction liquid for treating the print substrate or the printed matter may be used in order to enhance the print quality, e.g. by preventing excessive spreading of the ink compositions that may cause all kinds of print artifacts like (inter color) bleeding, coalescence, etc. Such methods are particularly useful to be used for printing on less to non-absorbing print substrates (print media), like machine coated paper or off-set coated paper.

In European Patent Application EP 1 125 760 A1 a recording method wherein a reaction solution and an ink composition are deposited onto a recording medium to perform printing and the recording medium is then washed with a polar solvent is disclosed.

It is a disadvantage of such methods that the color gamut may decrease with respect to methods of printing wherein no reaction liquid is used, while in the absence of using the reaction liquid the print quality, in particular on machine coated print substrates, is unsatisfactory.

Selecting an order of printing ink compositions for improving the print quality is known from the prior art, for example from U.S. Pat. No. 7,988,277. Such methods are for example based on the order of dynamic surface tension and are intended to e.g. prevent or mask (inter) color bleeding.

In International Patent Application WO 2013/065871 A1 it is disclosed that a recorded matter recorded on a recording medium includes a first layer formed by an ink A on or above the recording medium, the first layer having an index of refraction A; a second layer formed by an ink B on the first layer formed by the ink A, the second layer having an index of refraction B (where B<A); and a third layer formed by an ink C or by a transparent resin material on the second layer, the third layer having an index of refraction C (where C>A) and forming a surface layer of the recorded matter.

It is a disadvantage of such methods that although the print quality may improve, the color gamut is not optimal or even deteriorates.

Therefore, improving the print quality, in particular on machine coated media, and maintaining or even improving the color gamut, seem to be contradictory requirements.

SUMMARY OF THE INVENTION

It is therefore an object of the present invention to provide a method of printing that omits or at least mitigates the above stated disadvantage. That is a method of printing for creating printed matter having a high light-fastness, a high print quality and an optimized color gamut.

Therefore in a first aspect the present invention

The object is at least partly achieved by a method comprising the steps of:
a. providing a substrate, a reaction liquid comprising a coagulation agent and an ink set comprising a first ink composition comprising a first colorant and a second ink composition comprising a second colorant, different from the first colorant, wherein both the first colorant and the second colorant are dispersed as primary particles in the first ink composition and the second ink composition, respectively;
b. applying the reaction liquid to a first surface of the substrate;
c. printing a first layer of the first ink composition and a second ink layer of the second ink composition on the first surface of the substrate, wherein upon contact with the coagulation agent, the primary particles present in the first ink layer and in the second ink layer agglomerate such that secondary particles are formed in the first ink layer and in the second ink layer respectively, wherein the first ink layer obtains a first opacity and the second ink layer obtains a second opacity, wherein the ink layer obtaining the highest opacity is printed first.

Inventors have surprisingly found that by selecting a color sequence based on ink properties after reaction of the (primary) pigment particles with the coagulation agent present in a reaction liquid to form (secondary) pigment particles, enables color gamut optimization while maintaining a satisfactory print quality and the ability to use pigments that provide a high light-fastness.

The selected color sequence is based on the opacity of ink layers after coagulation of the pigment particles upon contact with the coagulation agent. The ink compositions are printed in the order of decreasing opacity, or in other words, the ink layers are printed in the order of increasing transparency.

Inventors have also found that by using the method above, i.e. by performing (pre-) treatment with the a reaction liquid and printing the inks from an ink set in the order of the opacity of ink layers after reaction with the coagulation agent from the primer composition, mottling can be prevented or reduced, when compared to the same order of printing without (pre-)treatment with the reaction liquid. Without wanting to be bound to any theory, it is believed that the mottling effect is caused by uneven light absorption in the first ink layer, which is reduced or prevented by applying the reaction liquid.

As an alternative solution, pigments having a smaller (primary) particle size can be used (e.g. by selecting pigments having smaller particle sizes of by grinding the pigment to obtain smaller particles) and hence a higher transparency, in order to prevent or at least reduce opacity of coagulated pigment particles (i.e. after contact with reaction liquid). However, using such pigments may lead to ink compositions having inferior light-fastness.

It is further noted that the method according to the present invention is of particular use in one directional printing (e.g. single pass printing with a page wide array of print heads), where intelligent printing strategies known for use in scanning printing systems cannot be used.

In an embodiment, the step c is performed after step b.

In an embodiment, step c is performed before step b.

In an embodiment, the ink set comprises a third ink composition comprising a third colorant different from the first and the second colorants and being dispersed in the third ink composition as primary particles, wherein in step c a third layer of the third ink composition is printed on the first surface of the substrate, wherein upon contact with the coagulation agent, the primary particles present in the third ink layer agglomerate such that secondary particles are formed in the third ink layer, wherein the third ink layer obtains a third opacity, wherein the ink layers are printed in order of their opacity, starting with the ink layer having the highest opacity.

In an embodiment, the ink set comprises a fourth ink composition comprising a fourth colorant different from the first, second and third colorants and being dispersed in the fourth ink composition as primary particles, wherein in step c a fourth layer of the fourth ink composition is printed on the first surface of the substrate, wherein upon contact with the coagulation agent, the primary particles present in the fourth ink layer agglomerate such that secondary particles are formed in the fourth ink layer, wherein the fourth ink layer obtains a fourth opacity, wherein the ink layers are printed in order of their opacity, starting with the ink layer having the highest opacity.

In an embodiment, the ink set comprises black, cyan, magenta and yellow ink compositions.

In an embodiment, the reaction liquid comprises a polyvalent metal salt as coagulation agent.

In an embodiment, the colorants are pigments.

In an embodiment, the pigments are: Pigment Yellow 74, Pigment Red 122, Pigment Blue 15:3, Pigment Black 7, wherein the order of ink layers is Yellow, Cyan, Magenta and blacK.

In an embodiment, the ink compositions comprise a latex resin.

In another aspect, the present invention pertains to printed matter, printed with a method according to the first aspect of the present invention.

In an embodiment the printed matter comprises a substrate having a first surface, the first surface comprising a first ink layer having a first opacity and a second layer having a second opacity, wherein the ink layer having the highest opacity is arranged closest to the first surface.

In an embodiment the first surface of the printed matter comprises a third ink layer having a third opacity, wherein the ink layers are arranged in the order of their opacity, wherein the ink layer having the highest opacity is arranged closest to the first surface.

In an embodiment the first surface of the printed matter comprises a fourth ink layer having a fourth opacity, wherein the ink layers are arranged in the order of their opacity, wherein the ink layer having the highest opacity is arranged closest to the first surface.

The printed matter of the above embodiments may comprise double layers, wherein a double layer consists of a first ink layer and a second ink layer, wherein the ink layer having the highest opacity is arranged closest to the substrate. In this way a masking effect of an ink layer having the higher opacity is less pronounces and the colour gamut at its optimum.

In an embodiment, the ink layers comprise black, cyan, magenta and yellow ink compositions, respectively.

In an embodiment, the inks comprise pigments as colorants.

In an embodiment, the pigments are Pigment Yellow 74, Pigment Red 122, Pigment Blue 15:3, Pigment Black 7, wherein the order of ink layers is Yellow, Cyan, Magenta and blacK.

In an embodiment the ink compositions used in the ink layers comprise a latex resin.

In an embodiment, the printed matter according comprises a machine coated substrate.

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Substrates

Figure 1:
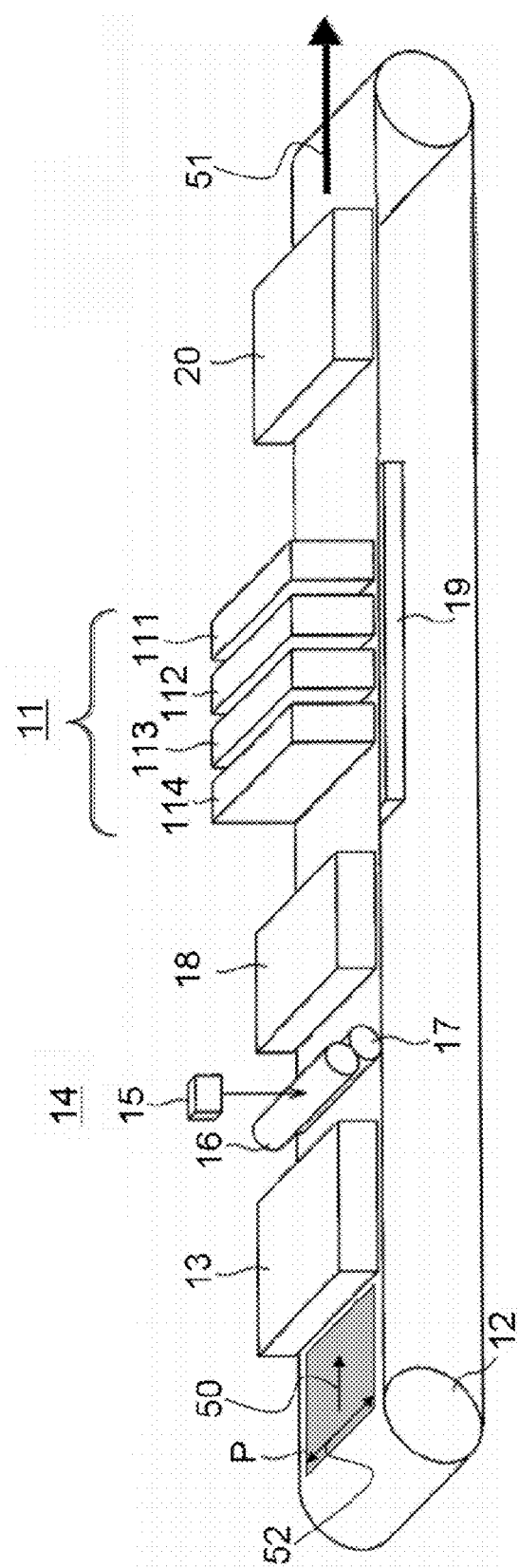
FIG. 1 shows a schematic representation of an inkjet printing system.

Print substrates (receiving media) suitable to be used in a method according to the present invention are not limited to any kind. Of particular interest are plain papers and machine coated (off-set coated) papers, which are well known in the art of printing.

Ink Compositions

Ink compositions suitable to be used in a method according to the present invention comprise dispersed colorants and are preferably aqueous ink compositions. The colorants are dispersed in the ink compositions as primary colorant particles.

The colorants may be dispersed dyes or pigments, combinations of dyes, combinations of pigments or combinations of dyes and pigments, as long as the dispersed colorants are capable to aggregate upon contact with the coagulation agent present in the reaction liquid used in a method according to the present invention.

Suitable ink compositions may further comprise stabilizing co-solvents, surfactants, dispersed polymer particles (latex) and other functional additives.

Suitable examples of individual ink components are well known in the art of printing.

Colorant

The colorant particles may be a pigment or a mixture of pigments, a dye or a mixture of dyes or a mixture comprising pigments and dyes, as long as the colorant is water-dispersed.

Examples of the pigment usable in the present invention include those commonly known without any limitation, and either a water-dispersed pigment or an oil-dispersed pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (CI Pigment Black 7) or metal-based pigments (e.g., copper, iron (CI Pigment Black 11), and titanium oxide; and organic pigments (e.g., aniline black (CI Pigment Black 1).

The amount of the water-insoluble pigment contained in the inkjet ink, as a solid content, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing degradation in ink ejection stability.

Reaction Liquid

Reaction liquids suitable to be used in a method according to the present invention comprise a coagulation agent that is capable of aggregating the dispersed colorant (primary) particles such that secondary particles are formed. Secondary colorant particles are formed by aggregation (sticking-together) of two or more primary particles and consequently have a larger size than primary colorant particles.

Suitable coagulation agents are well known in the art and comprise acidic compounds and polyvalent metal salts. Such compounds are capable of destabilizing dispersed particles, in particular dispersed colorant particles and hence induce aggregation of such particles.

Printing Process

A printing process in which the inks according to the present invention may be suitably used is described with reference to the appended drawings shown in FIG. 1. FIG. 1 shows schematic representations of an inkjet printing system.

FIG. 1 shows that a sheet of a receiving medium (print substrate), in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises of the following steps: media treatment, image formation, drying and fixing.

Media Pre-Treatment

To improve the spreading and pinning (i.e. fixation of pigments and water-dispersed polymer particles) of the ink on the receiving medium, in particular on slow absorbing media, such as machine coated media, the receiving medium may be pretreated, i.e. treated prior to printing an image on the medium. The pre-treatment step may comprise one or more of the following:

preheating of the receiving medium to enhance spreading of the used ink on the receiving medium and/or to enhance absorption of the used ink into the receiving medium;

primer pre-treatment for increasing the surface tension of receiving medium in order to improve the wettability of the receiving medium by the used ink and to control the stability of the dispersed solid fraction of the ink composition (i.e. pigments and dispersed polymer particles). Primer pre-treatment may be performed in the gas phase, e.g. with gaseous acids such as hydrochloric acid, sulfuric acid, acetic acid, phosphoric acid and lactic acid, or in the liquid phase by coating the receiving medium with a reaction liquid. The reaction liquid may comprise water as a solvent, one or more cosolvents, additives such as surfactants and at least one compound selected from a polyvalent metal salt, an acid and a cationic resin;

corona or plasma treatment.

Primer Pre-Treatment

As an application way of the reaction liquid, any conventionally known methods can be used. Specific examples of an application way include: a roller coating, an ink-jet application, a curtain coating and a spray coating. There is no specific restriction in the number of times with which the reaction liquid is applied. It may be applied at one time, or it may be applied in two times or more. Application in two times or more may be preferable, since cockling of the coated printing paper can be prevented and the film formed by the surface reaction liquid will produce a uniform dry surface having no wrinkle by applying in 2 steps or more.

Especially a roller coating (see 14 in FIG. 1) method is preferable because this coating method does not need to take into consideration of ejection properties and it can apply the reaction liquid homogeneously to a recording medium. In addition, the amount of the applied reaction liquid with a roller or with other means to a recording medium can be suitably adjusted by controlling: the physical properties of the reaction liquid; and the contact pressure of a roller in a roller coater to the recording medium and the rotational speed of a roller in a roller coater which is used for a coater of the reaction liquid. As an application area of the reaction liquid, it may be possible to apply only to the printed portion, or to the entire surface of both the printed portion and the non-printed portion. However, when the reaction liquid is applied only to the printed portion, unevenness may occur between the application area and a non-application area caused by swelling of cellulose contained in the coated printing paper with the water in the reaction liquid followed by drying. Then, from the viewpoint of drying uniformly, it is preferable to apply a reaction liquid to the entire surface of a coated printing paper, and roller coating can be preferably used as a coating method to the whole surface. The reaction liquid may be an aqueous reaction liquid.

Corona or Plasma Treatment

Corona or plasma treatment may be used as a pre-treatment step by exposing a sheet of a receiving medium to corona discharge or plasma treatment. In particular when used on media like polyethylene (PE) films, polypropylene (PP) films, polyethyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbondioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the reaction liquid is applied on the surface of the receiving medium P at reaction liquid applying member 14. Specifically, the reaction liquid is provided from storage tank 15 of the reaction liquid to the reaction liquid applying member 14 composed of double rolls 16 and 17. Each surface of the double rolls may be covered with a porous resin material such as sponge. After providing the reaction liquid to auxiliary roll 16 first, the reaction liquid is transferred to main roll 17, and a predetermined quantity is applied on the surface of the receiving medium P. Subsequently, the coated printing paper P on which the reaction liquid was supplied may optionally be heated and dried by drying member 18 which is composed of a drying heater installed at the downstream position of the reaction liquid applying member 14 in order to decrease the quantity of the water content in the reaction liquid to a predetermined range. It is preferable to decrease the water content in an amount of 1.0 weight % to 30 weight % based on the total water content in the provided reaction liquid provided on the receiving medium P.

To prevent the transportation mechanism 12 being contaminated with reaction liquid, a cleaning unit (not shown) may be installed and/or the transportation mechanism may be comprised multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Hitherto, the printing process was described such that the image formation step was performed in-line with the pre-treatment step (e.g. application of an (aqueous) reaction liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a reaction liquid, the (optional) step of drying a coating solution, the step of ejecting an inkjet ink to form an image and the step or drying an fixing the printed image are performed. It is, however, preferable to carry out image formation with the above defined in-line image forming method.

EXAMPLES

Materials

The pigments used in the Examples are Fuji APD-1000 CMYK, which are obtained from FujiFilm Imaging Corp. (FFIC).

The latex used in the Examples is NeoCryl® A-633, a styrene-acrylate latex which is obtained from DSM.

pH modifier, Vantex®-T (N,n-butyl-N,N-diethanol amine) is obtained from Taminco Industries.

All other materials used in the Examples are obtained from Sigma Aldrich, unless stated otherwise. All materials are used as received, unless otherwise stated.

Print Substrates:

Terraprint silk is a machine coated print substrate obtained from Stora Enzo.

Yellow label is a plain paper print substrate obtained from Océ (Canon).

Methods

Opacity of Ink Layers

The opacity of a Yellow ink layer is determined by printing a yellow ink layer on top of a blacK ink layer. Both layers are printed with a Kyocera KJB4 printhead with 18 pl droplets at 600×600 dpi and 100% coverage. Then a CIELAB color measurement on the K-Y double layer is performed using the Eye One ISIS apparatus of X-Rite and a*, b* and L* are determined. This procedure is repeated for blacK-Cyan and blacK-Magenta double layers and for Y-K, C-K and M-K double layers (Black printed on top of Yellow, Cyan and Magenta respectively. From these data $\Delta E_{DL}$ is calculated as follows:

$$\Delta E_{DL} = \sqrt{[(L^*_{DL}-L^*_0)^2+(a^*_{DL}-a^*_0)^2+(b^*_{DL}-b^*_0)^2]}$$

Wherein:

$\Delta E_{DL}=\Delta E$ double layer (K-Y, K-C, K-M, Y-K, K-C, K-M, respectively); $\Delta E_{DL}$ represents the modulus of the shift in the L*, a*, b* color space of a double layer comprising a blacK layer, with reference to a single blacK layer. The smaller $\Delta E_{DL}$, the smaller the deviation of the color of the respective double layer is from a single layer blacK.

$L^*_{DL}$, $a^*_{DL}$, $b^*_{DL}$ are the CIELAB parameters of the respective double layers $L^*_0$, $a^*_0$, $b^*_0$ are the CIELAB parameters of a single layer of blacK (600×600 dpi and 100% coverage).

The opacity is judged by $\Delta E_{DL}$: The $\Delta E_{DL}$ indicates the hiding power of the top layer and hence the opacity of the top layer. The higher $\Delta E_{DL}$, the higher the opacity (i.e. lower transparency) the top layer has.

Color Gamut

The color gamuts are determined by printing ECI2002 charts, according to ISO 12642 (http://www.eci.org/en/projects/eci2002). The charts are analyzed using an Eye one ISIS apparatus from X-Rite. Color gamut is represented by graphs wherein the b*-value (y-axis) is printed as a function of the a*-value (x-axis).

Color Fastness

Color fastness is determined by a standard blue wool scale test, commonly known in the art of printing. The blue wool scale is rated from 1-8, wherein 1 indicates a poor light fastness and 8 indicates an excellent light fastness.

Primer Application

Primer is jetted with a Kyocera KJB4 head using the smallest dot sizes (DS1) and a coverage between 0.3 and 2 g/m$^2$ reaction liquid (approximately between 15% and 100% coverage) dependent on the recording substrate used.

Preparation Example 1: Preparation of Treatment Liquid

The primer solution can be prepared by solving the salts and co-solvents as indicated in Table 1 in water and adding surfactants. The primer solution is stirred for 15 minutes and then filtered over a 1 μm absolute pall filter.

TABLE 1

Composition reaction liquid according to Preparation Example 1

| Component | | amount [wt %] |
|---|---|---|
| Cosolvent | Glycerin | 21.2 |
| Salt | Mg-pidolate | 18.5 |
| Surfactant mix[1] | | 3.3 |
| Solvent | UHQ water | to 100% |

[1] a mixture of surfactants is used to improve spreading behavior of the reaction liquid, which can be suitably selected from the prior art.

Preparation Example 2: Preparation of Ink Compositions

Cyan, Magenta, Yellow and blacK ink compositions were prepared by mixing the components as shown in Table 2 and stirred for 30 min. Finally the ink compositions were filtered over a 1 μm absolute pall filter.

TABLE 2

Composition of CMYK inks according to Preparation Example 2

| Component | | Cyan m [g] | Cyan wt % | blacK m [g] | blacK wt % | Yellow m [g] | Yellow wt % | Magenta m [g] | Magenta wt % |
|---|---|---|---|---|---|---|---|---|---|
| solvent | water | 36.6 | 61.7 | 32.4 | 61.8 | 31.5 | 61.7 | 25.6 | 60.8 |
| cosolvent mix[2] | | 24 | 24 | 24 | 24 | 24 | 24 | 24 | 24 |
| surfactant mix[2] | | 3.1 | 3.1 | 3.1 | 3.1 | 3.2 | 3.1 | 3.1 | 3.1 |
| pH-modifier | Vantex ®-T | 0.5 | 0.5 | 0.5 | 0.5 | 0.5 | 0.5 | 0.5 | 0.5 |
| Latex | NeoCryl ® A633 | 21.6 | 8.7[3] | 19.3 | 7.7[3] | 19.3 | 7.7[3] | 19.3 | 7.7[3] |
| Pigment | Fuji APD-1000 (CMYK) | 14.2 | 2.0[4] | 20.7 | 2.9[4] | 21.4 | 3.0[4] | 27.5 | 3.8[4] |

[2] Cosolvent mix and surfactant mix can be suitably selected as known in the art for optimizing jetting and spreading behavior of the ink compositions;
[3] Wt % resin particles with respect to the total ink composition (the used latex dispersion is a NeoCryl ® A633 latex dispersion obtained from DSM containing 40 wt % of resin particles (solids);
[4] Wt % pigment particles with respect to the total ink composition (the used pigment dispersions are Fuji APD-1000 pigments obtained from FFIC containing 14 wt % pigment particles (solids)).

The light fastness of the ink set shown in Table 1 is determined on an ink jet coated matt print substrate, an uncoated print substrate (plain paper) and on a machine coated gloss print substrate. The blue wool scale ratings were 5.6, 5.4 and 7.0 respectively, which indicates that the light fastness is good (on plain paper) to excellent (on MC gloss).

The opacities of these ink compositions with and without the use of the reaction liquid as a primer according to preparation example 1 were determined with the above described method. The recording substrate used was Terraprint silk. The results are shown in Table 3.

TABLE 3

CIELAB parameters of double layers

| Double layer | without primer | | | | with primer (20% coverage) | | | |
|---|---|---|---|---|---|---|---|---|
| | $L^*_{DL}$ | $a^*_{DL}$ | $b^*_{DL}$ | $\Delta E_{DL}$ | $L^*_{DL}$ | $a^*_{DL}$ | $b^*_{DL}$ | $\Delta E_{DL}$ |
| K-Y | 17.0 | −6.3 | 5.8 | 10.6 | 22.8 | −13.5 | 8.4 | 20.1 |
| K-M | 8.3 | 8.6 | −2.2 | 8.7 | 16.1 | 6.1 | −3.7 | 9.0 |
| K-C | 7.0 | −3.7 | −4.6 | 9.4 | 10.3 | −2.4 | −6.2 | 9.2 |

TABLE 3-continued

CIELAB parameters of double layers

| Double layer | without primer | | | | with primer (20% coverage) | | | |
|---|---|---|---|---|---|---|---|---|
| | $L^*_{DL}$ | $a^*_{DL}$ | $b^*_{DL}$ | $\Delta E_{DL}$ | $L^*_{DL}$ | $a^*_{DL}$ | $b^*_{DL}$ | $\Delta E_{DL}$ |
| Y-K | 14.9 | -3.6 | 4.3 | 6.8 | 10.8 | -0.2 | -0.8 | 3.3 |
| M-K | 12.8 | 2.5 | -2.7 | 5.2 | 10.1 | 2.1 | -2.7 | 4.9 |
| C-K | 6.1 | -3.2 | -5.9 | 10.5 | 12.6 | -3.5 | -8.9 | 12.2 |
| single layer black | 11 | 1.6 | 2.1 | 0 | | | | |

All printed double layers are supposed to be black (subtractive color mixing), therefore the smaller $\Delta E_{DL}$, the closer the color of the respective double layer is to blacK. Table 3 shows that with and without using primer, $\Delta E_{DL}$ is smaller for the Y-K double layer than for the K-Y double layer, indicating that when the yellow ink layer is printed on top the shift in the color space is larger than when black is printed on top. The yellow ink is therefore more opaque (less transparent) than the black ink, both without and with using primer. The same holds for the M-K double layer compared to the K-M double layer, only the difference between $\Delta E_{DL}$ between said double layers is less pronounced than for the Y-K and K-Y double layers. The opacity of the magenta ink is therefore larger than the opacity of the black ink, but smaller than the yellow ink.

For the K-C and C-K double layers the shift in the color space is smallest for the K-C layer, indicating that the cyan ink is less opaque than the black ink. However the differences are small. Therefore, the order of printing cyan and black ink is of less importance In conclusion, arranging the ink compositions in the order of (decreasing) opacity, the order will be YMKC or YMCK.

Table 3 further shows that the differences in opacity when primer is used are more pronounced than when no primer is used, in particular for the yellow ink. Therefore it is expected that the color gamut becomes more dependent on color sequence when primer is used.

Comparative Examples A and B: No (Pre-)Treatment, Order of Printing KCMY

The ink compositions as prepared in Preparation Example 2 were printed on Terraprint silk (Comparative Example A) and Yellow label (Comparative Example B) with a CMYK test setup with Kyocera KJB4 print heads. The color sequence of printing was KCMY.

Comparative Examples C and D: (Pre-)Treatment, Order of Printing KCMY

Sheets of printing substrates Terraprint silk (Comparative Example C) and Yellow label (Comparative Example D) were treated with the reaction liquid according to Preparation Example 1, such that the coverage was 20%-25% on Terraprint silk and 100% on yellow label.

Comparative Examples E and F: No (Pre-)Treatment, Order of Printing YMCK

Comparative Examples A and B were repeated, with the difference that the color sequence was YMCK.

Working Examples 1 and 2: (Pre-)Treatment, Order of Printing YMCK

Comparative Examples C and D were repeated, with the difference that the color sequence was YMCK (see Comparative Examples E and F).

TABLE 4 overview of comparative examples A-F and working examples 1-2

| | A | B | C | D | E | F | 1 | 2 |
|---|---|---|---|---|---|---|---|---|
| print substrate | Terra print | Yellow Label | Terra print | Yellow Label | Terra print | Yellow Label | Terra print | Yellow Label |
| primer coverage (%) | 0 | 0 | 25 | 100 | 0 | 0 | 20 | 100 |
| order of printing | KCMY | KCMY | KCMY | KCMY | YMCK | YMCK | YMCK | YMCK |
| Color Gamut in FIG. | 3 | 2 | 3 | 2 | 3 | 2 | 3 | 2 |
| marker | ◇ | ◇ | □ | □ | △ | △ | x | x |
| | diamond | | square | | triangle | | cross | |

Figure 2:
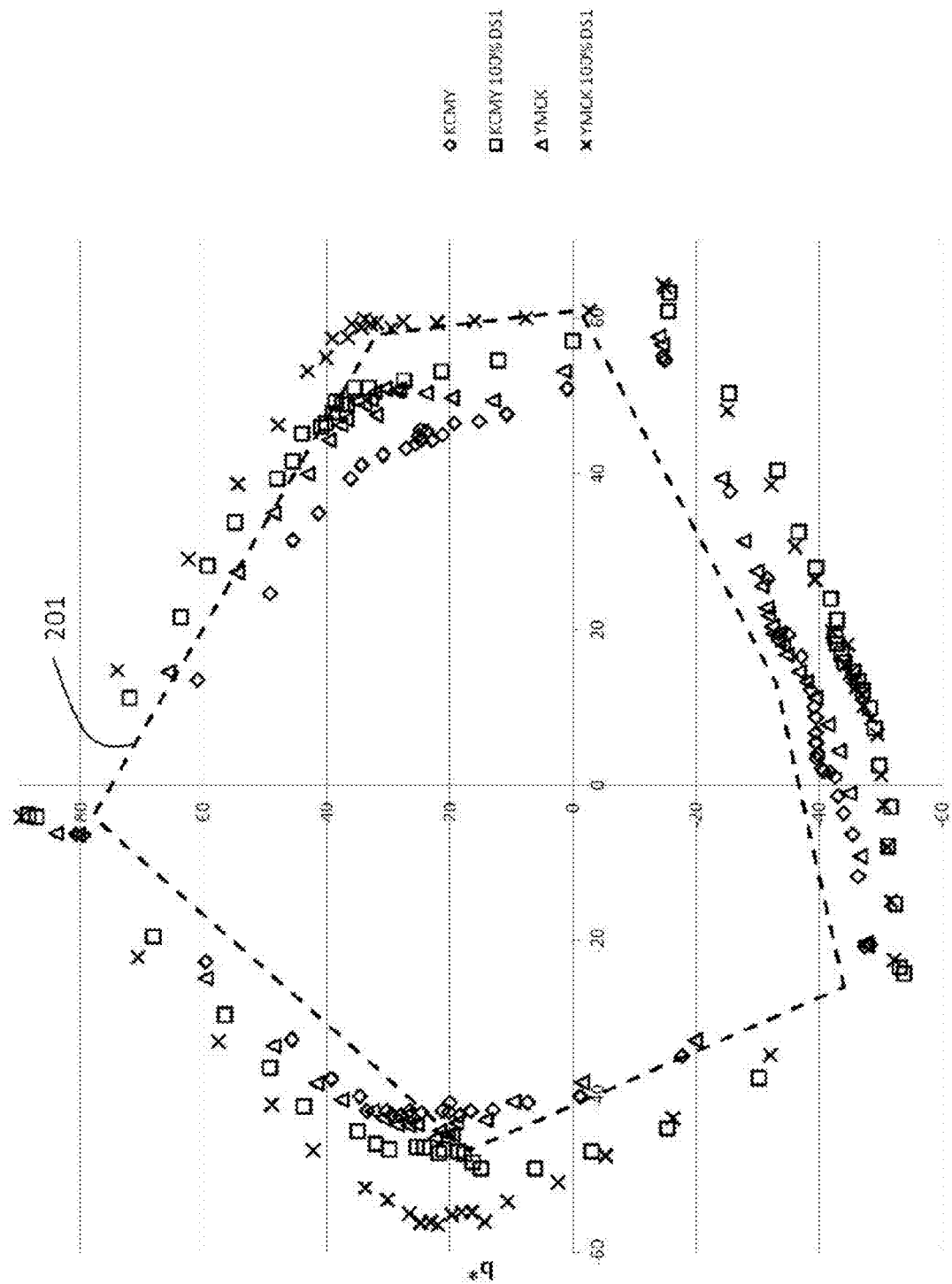
FIG. 2 shows a graph of color gamuts determined in Comparative Examples B, D, F and Example 2.

From FIG. 2 it can be deduced that when the inks are printed in the KCMY order on Yellow Label (diamonds), the color gamut improves when a reaction liquid is applied (squares). By changing the color sequence to YMCK (triangles) the color gamut slightly increases with reference to the KCMY color sequence (diamonds). Without wanting to be bound to any theory, it is expected that this is due to the fact that the YMCK color sequence represents the order of opacity of the ink compositions before coagulation of the pigment particles upon contact with the coagulation agent present in the reaction liquid (see above). When the YMCK color sequence is used in combination with application of the reaction liquid (crosses), the color gamut significantly improves compared to the KCMY color sequence combined with application of reaction liquid (squares). Compared to a (desired) reference color gamut on an uncoated medium (ISO 12647-2 type 4, curve 201 in FIG. 2.) the YMCK color sequence combined with application of reaction liquid (crosses) qualifies as excellent.

Figure 3:
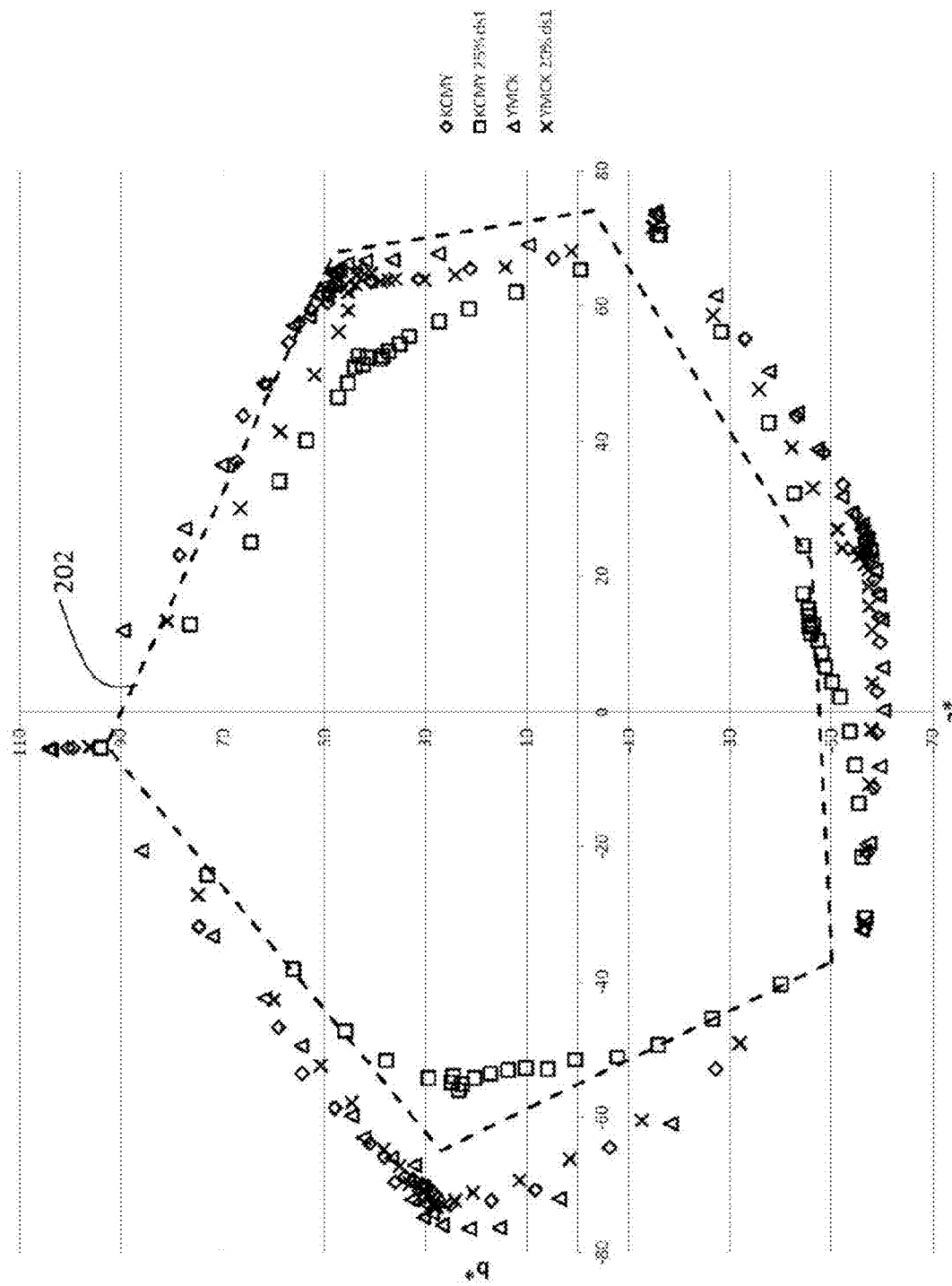
FIG. 3 shows a graph of color gamuts determined in Comparative Examples A, C, E and Example 1.

From FIG. 3 it can be deduced that when the inks are printed in the KCMY (diamonds) order on a Terra print silk print medium, the color gamut significantly decreases when a reaction liquid is applied in combination with KCMY printing (squares). When the color sequence is adapted to the order of opacity of aggregated pigments (YMCK, triangles), the color gamut does not significantly change with respect to the KCMY color sequence without application of reaction liquid (diamonds). When this order of printing is combined with the application of a reaction liquid (crosses), the color gamut does not deteriorate significantly and is significantly better than the color gamut of the KCMY sequence combined with application of reaction liquid. Compared to a (desired) reference color gamut on an coated medium (Fogra 39, curve 202 in FIG. 3.) the YMCK color sequence combined with application of reaction liquid (crosses) qualifies as very good.

Therefore, it can be concluded that printing in the order of opacity of the ink compositions even if no reaction liquid is applied may have positive influence on the color gamut (at least visible on plain paper, see FIG. 2). When using (pre-)treatment with a reaction liquid in order to improve print quality, the effect of printing the ink compositions in the order of opacity after contact with the coagulation agent present in the reaction liquid on the color gamut is even more pronounced. Color gamut can be maintained or even improved when the order of printing the colored inks (CMYK) is adapted such that they are printed in order of opacity of the aggregated pigment particles (secondary particles).

The invention claimed is:

1. A method of printing comprising the steps of:
   providing a substrate, a reaction liquid comprising a coagulation agent and an ink set comprising a first ink composition comprising a first colorant and a second ink composition comprising a second colorant, different from the first colorant, wherein both the first colorant and the second colorant are dispersed as primary particles in the first ink composition and the second ink composition, respectively;
   applying the reaction liquid to a first surface of the substrate;
   determining which of the first and second ink compositions will have the highest opacity once printed onto the first surface of the substrate and reacted with the coagulation agent of the reaction liquid;
   printing, on the first surface of the substrate, a first ink layer of the determined one of the first and second ink compositions having the highest opacity; then
   printing a second ink layer of the other of the first and second ink compositions,
   wherein during printing, the primary particles present in the first ink layer and in the second ink layer agglomerate upon contact with the coagulation agent to form secondary particles in the first ink layer and in the second ink layer, respectively.

2. The method according to claim 1, wherein the step of printing is performed after the step of applying.

3. The method according to claim 1, wherein the step of printing is performed before the step of applying.

4. The method according to claim 1, wherein the ink set comprises a third ink composition comprising a third colorant different from the first and the second colorants and being dispersed in the third ink composition as primary particles, wherein in the step of printing, a third layer of the third ink composition is printed on the first surface of the substrate, wherein upon contact with the coagulation agent, the primary particles present in the third ink layer agglomerate to form secondary particles in the third ink layer, wherein the third ink layer obtains a third opacity, and wherein the first, second and third ink layers are printed in order of their opacity, starting with first the ink layer having the highest opacity.

5. The method according to claim 4, wherein the ink set comprises a fourth ink composition comprising a fourth colorant different from the first, second and third colorants and being dispersed in the fourth ink composition as primary particles, wherein in the step of printing, a fourth layer of the fourth ink composition is printed on the first surface of the substrate, wherein upon contact with the coagulation agent, the primary particles present in the fourth ink layer agglomerate to form secondary particles in the fourth ink layer, wherein the first, second, third and fourth ink layers are printed in order of their opacity, starting with the first ink layer having the highest opacity.

6. The method according to claim 5, wherein the ink set comprises black, cyan, magenta and yellow ink compositions.

7. The method according to claim 1, wherein the reaction liquid comprises a polyvalent metal salt as coagulation agent.

8. The method according to claim 1, wherein the colorants are pigments.

9. The method according to claim 8, wherein the pigments are Pigment Yellow 74, Pigment Red 122, Pigment Blue 15:3, and Pigment Black 7, and wherein the order of ink layers is Yellow, Cyan, Magenta and black.

10. The method according to claim 1, wherein the ink compositions comprise a latex resin.

11. The method according to claim 2, wherein the reaction liquid comprises a polyvalent metal salt as coagulation agent.

12. The method according to claim 3, wherein the reaction liquid comprises a polyvalent metal salt as coagulation agent.

13. The method according to claim 4, wherein the reaction liquid comprises a polyvalent metal salt as coagulation agent.

14. The method according to claim 5, wherein the reaction liquid comprises a polyvalent metal salt as coagulation agent.

15. The method according to claim 6, wherein the reaction liquid comprises a polyvalent metal salt as coagulation agent.

16. The method according to claim 2, wherein the colorants are pigments.

17. The method according to claim 3, wherein the colorants are pigments.

18. The method according to claim 4, wherein the colorants are pigments.

* * * * *